US010046492B2

(12) United States Patent
Ikeda (10) Patent No.: US 10,046,492 B2
(45) Date of Patent: Aug. 14, 2018

(54) PRODUCING METHOD FOR CABLE WITH RESIN MOLD (71) Applicant: Hitachi Metals, Ltd., Tokyo (JP)

(72) Inventor: Yukio Ikeda, Hitachi (JP)

(73) Assignee: HITACHI METALS, LTD., Tokyo (JP)

(*) Notice: Subject to any disclaimer, the term of this patent is extended or adjusted under 35 U.S.C. 154(b) by 278 days.

(21) Appl. No.: 14/866,448

(22) Filed: Sep. 25, 2015

(65) Prior Publication Data
US 2016/0089823 A1 Mar. 31, 2016

(30) Foreign Application Priority Data

Sep. 30, 2014 (JP) ................. 2014-199867

(51) Int. Cl.
H01B 13/06 (2006.01)
B29C 45/14 (2006.01)
B29C 45/00 (2006.01)
B29C 45/26 (2006.01)
(Continued)

(52) U.S. Cl.
CPC .... *B29C 45/14549* (2013.01); *B29C 45/0053* (2013.01); *B29C 45/14639* (2013.01); *B29C 45/14811* (2013.01); *B29C 45/2669* (2013.01); *H01B 13/06* (2013.01); *B29K 2021/003* (2013.01); *B29K 2995/0005* (2013.01); *B29K 2995/0007* (2013.01); *B29L 2031/3462* (2013.01)

(58) Field of Classification Search
CPC . H01L 2924/00014; H01L 2224/83862; H01L 2224/97; H01L 2224/81; H01L 2224/83; H01L 2224/131; H01L 2224/2919; H01L 2224/75734; H01L 2224/75744; H01L 2224/83986; H01L 2224/9211
See application file for complete search history.

(56) References Cited

U.S. PATENT DOCUMENTS 4,461,736 A * 7/1984 Takagi ............... B29C 44/12
156/48
5,013,495 A * 5/1991 Noba ................. B29C 33/123
264/1.25
(Continued)

FOREIGN PATENT DOCUMENTS

JP 2010-048689 A 3/2010

*Primary Examiner* — Minh Trinh
(74) *Attorney, Agent, or Firm* — McGinn I.P. Law Group, PLLC.

(57) ABSTRACT

A method for producing a cable with a resin mold including a cable section comprising an electric wire and a sheath comprising a synthetic resin covering the electric wire, and a resin mold section into which a portion of the sheath is molded by a resin is provided. A portion of the cable section is received in a receiving space in a die formed with a molten resin inlet, an inflow passage, and a resin reservoir therein. A molten resin is injected from the inlet into the receiving space. A portion of the injected molten resin flows through the inflow passage and is retained in the resin reservoir. The portion of the sheath is molten by heat of the molten resin. The molten resin is solidified to thereby form a molded resin product. Its unnecessary portion solidified in the resin reservoir is removed from the molded resin product.

9 Claims, 6 Drawing Sheets (51) Int. Cl.
*B29K 21/00* (2006.01)
*B29L 31/34* (2006.01)

(56) References Cited

U.S. PATENT DOCUMENTS

| | | | | |
|---|---|---|---|---|
| 5,027,497 | A | * | 7/1991 | Takaki .................. B22D 19/14 |
| | | | | 174/177 |
| 9,640,299 | B2 | * | 5/2017 | Sugita ................. C08L 23/0815 |
| 9,640,302 | B2 | * | 5/2017 | Takahashi ................ H01B 7/24 |
| 9,701,051 | B2 | * | 7/2017 | Ikeda ................. G01D 11/245 |
| 2008/0132104 | A1 | * | 6/2008 | Iwase ................ B29C 45/14311 |
| | | | | 439/279 |
| 2011/0127995 | A1 | | 6/2011 | Nishikawa et al. |
| 2014/0320113 | A1 | * | 10/2014 | Adachi .................. G01P 1/026 |
| | | | | 324/207.2 |
| 2016/0089823 | A1 | * | 3/2016 | Ikeda ................. B29C 45/0053 |
| | | | | 29/428 |

* cited by examiner

PRODUCING METHOD FOR CABLE WITH RESIN MOLD

The present application is based on Japanese patent application No. 2014-199867 filed on Sep. 30, 2014, the entire contents of which are incorporated herein by reference.

BACKGROUND OF THE INVENTION

1. Field of the Invention

This invention relates to a producing method for a cable with a resin mold.

2. Description of the Related Art

Conventionally, a rotation sensor is known that is comprised of a magnetic sensor element, and a cable for taking an output signal of the sensor element to outside, wherein the sensor element and one end of the cable are molded (Refer to JP-A-2010-48689).

The rotation sensor described in JP-A-201048689 includes a substrate with the sensor element mounted thereon and the one end of the cable attached thereto, and the sensor element and the substrate together with the one end of the cable are covered with a molding portion. The molding portion is formed by using dies comprising upper and lower dies, and molding a molding material comprising a thermoplastic elastomer or rubber material.

The upper and lower dies are formed with grooves having a smaller diameter than an outer diameter of the cable in their respective portions respectively facing each other, and the cable is held in the grooves. This prevents the cable from slipping therefrom due to pressure inside the dies during molding of the molding portion. Therefore, enhancement in waterproofing reliability is ensured.

See e.g. JP-A-2010-48689

SUMMARY OF THE INVENTION

In the rotation sensor configured as described above, when the outer surface of the cable sheath (cable cover) and the inner surface of the molding portion are not in close contact with each other around the entire circumference of the sheath, there is a likelihood of ingress of moisture through a small gap between the sheath and the molding portion. Once moisture entering through the gap reaches the sensor element, it can adversely affect the detection accuracy of the sensor element.

Accordingly, it is an object of the present invention to provide a method for producing a cable with a resin mold, which is capable of enhancing waterproofing against ingress of moisture through a gap between a sheath of a cable and a molded resin product.

According to an embodiment of the invention, a method for producing a cable with a resin mold including a cable section comprising an electric wire and a sheath comprising a synthetic resin covering the electric wire, and a resin mold section into which a portion of the sheath is molded by a resin, comprises:

receiving a portion of the cable section in a receiving space in a die formed with a molten resin inlet, an inflow passage, and a resin reservoir therein;

injecting a molten resin from the inlet into the receiving space, a portion of the injected molten resin flowing through the inflow passage and being retained in the resin reservoir, the portion of the sheath being molten by heat of the molten resin;

solidifying the molten resin to thereby form a molded resin product; and removing its unnecessary portion solidified in the resin reservoir from the molded resin product.

In the embodiment, the following modifications and changes may be made.

(i) The inflow passage is open into the receiving space at such a location that the portion of the sheath lies between the inflow passage and the inlet.

(ii) The inflow passage includes a gradual narrowing portion, which gradually narrows in flow passage area from a resin reservoir side toward a receiving space side opening.

(iii) The molded resin product after the removing of the unnecessary portion includes a circular cylindrical portion with the cable section being arranged at the center thereof, and the circular cylindrical portion is not larger than 15 mm in outer diameter.

(iv) The method further comprises connecting to the electric wire a sensor to measure a physical quantity, and molding the sensor together with the portion of the sheath.

Points of the Invention

The method for producing the cable with the resin mold according to the invention makes it possible to enhance waterproofing against ingress of moisture through a gap between the sheath of the cable and the molded resin product.

BRIEF DESCRIPTION OF THE DRAWINGS

The preferred embodiments according to the invention will be explained below referring to the drawings, wherein.

DETAILED DESCRIPTION OF PREFERRED EMBODIMENTS

Embodiment

Figure 1:
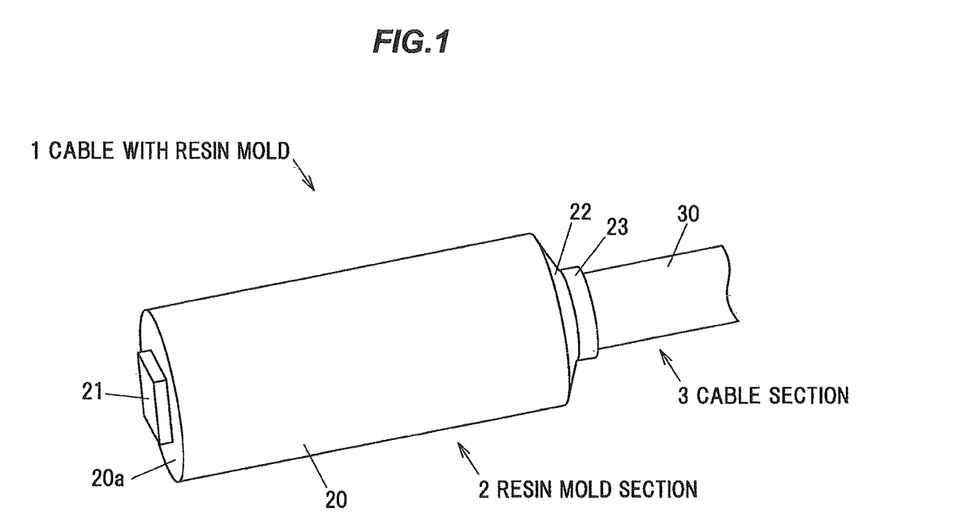
FIG. 1 is a perspective view showing an appearance of a cable with a resin mold produced with a producing method in an embodiment of the present invention.
Figure 2A:
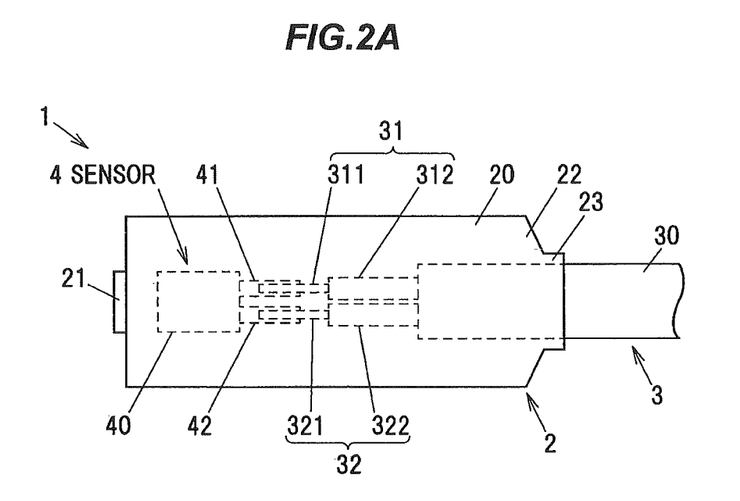
FIG. 2A is a top view showing the cable with the resin mold.
Figure 2B:
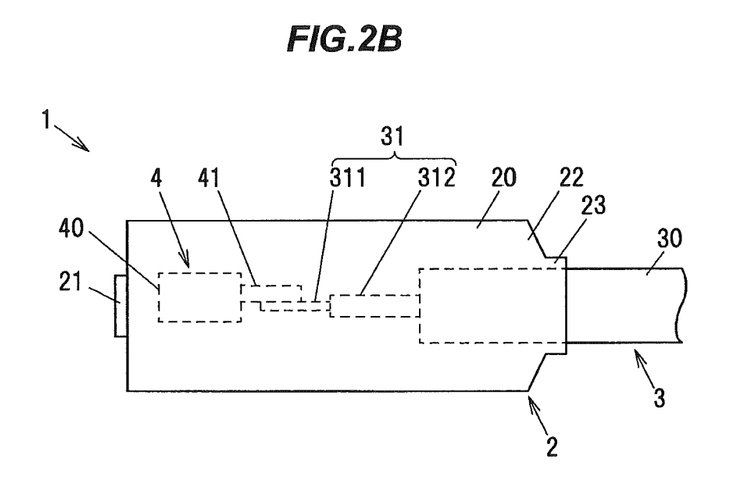
FIG. 2B is a side view showing the cable with the resin mold.

FIG. 1 is a perspective view showing an appearance of a cable 1 with a resin mold produced with a producing method in the embodiment of the present invention. FIG. 2A is a top view showing the cable 1 with the resin mold. FIG. 2B is a side view showing the cable 1 with the resin mold.

The cable 1 with the resin mold includes a resin mold section 2 comprising a molded resin, a cable section 3 having an end molded by the resin mold section 2, and a sensor 4 connected to the cable section 3. In FIGS. 2A and 2B, the cable section 3 and the sensor 4 in the interior of the resin mold section 2 are indicated by a broken line.

The resin mold section 2 includes a circular cylindrical portion 20, a boss 21, which is protruded from an end face 20a of the circular cylindrical portion 20 in an axial direction of the circular cylindrical portion 20, a tapered portion 22, which is formed at the opposite end to the boss 21, and an annular extended portion 23, which extends along the cable section 3 at a tip of the tapered portion 22. The circular cylindrical portion 20 is not larger than 15 mm in outer diameter, and the cable section 3 is disposed at the center of the circular cylindrical portion 20. The boss 21 is formed in a polygonal shape (in the example shown in FIG. 1, a rectangular shape) when viewed in the axial direction.

The cable section 3 includes first and second electric wires 31 and 32, and a sheath 30 comprising a synthetic resin, and the first and second electric wires 31 and 32 together are covered with the sheath 30. A portion of the sheath 30 is molded by the resin of the resin mold section 2. The first electric wire 31 includes a central conductor 311 comprising a highly conductive metal such as copper, and an electrically insulating coating 312, which coats the central conductor 311. The second electric wire 32 likewise includes a central conductor 321 comprising a highly conductive metal such as copper, and an electrically insulating coating 322, which coats the central conductor 321.

The first and second electric wires 31 and 32 are exposed from an end of the sheath 30 molded by the resin mold section 2. Also, the electrically insulating coatings 312 and 322 are removed at the end of the first and second electric wires 31 and 32, so that the central conductors 311 and 321 are exposed in the portions from which the electrically insulating coatings 312 and 322 have been removed.

The sensor 4 is designed to measure a physical quantity, such as magnetic field strength and the like, and includes a body 40 including a detecting portion for the physical quantity, and first and second lead wires 41 and 42, which are drawn from the body 40. The body 40 is configured in such a manner that its detecting portion comprising a Hall element for example is sealed with a sealant such as resin, ceramic or the like and the whole thereof, together with the portion of the sheath 30, is molded by the resin mold section 2. The first lead wire 41 is electrically connected by soldering or welding to the central conductor 311 of the first electric wire 31, while the second lead wire 42 is likewise electrically connected to the central conductor 321 of the second electric wire 32.

The cable 1 with the resin mold is used in, for example, a measuring device to detect a rotational speed of an object to be measured from a change in magnetic field strength, and the resin mold section 2 is received in a receiving hole formed in that measuring device. The boss 21 of the resin mold section 2 acts as an antirotating portion to suppress the rotation of the resin mold section 2 within that receiving hole.

Method of Producing the Cable with the Resin Mold

Figure 3:
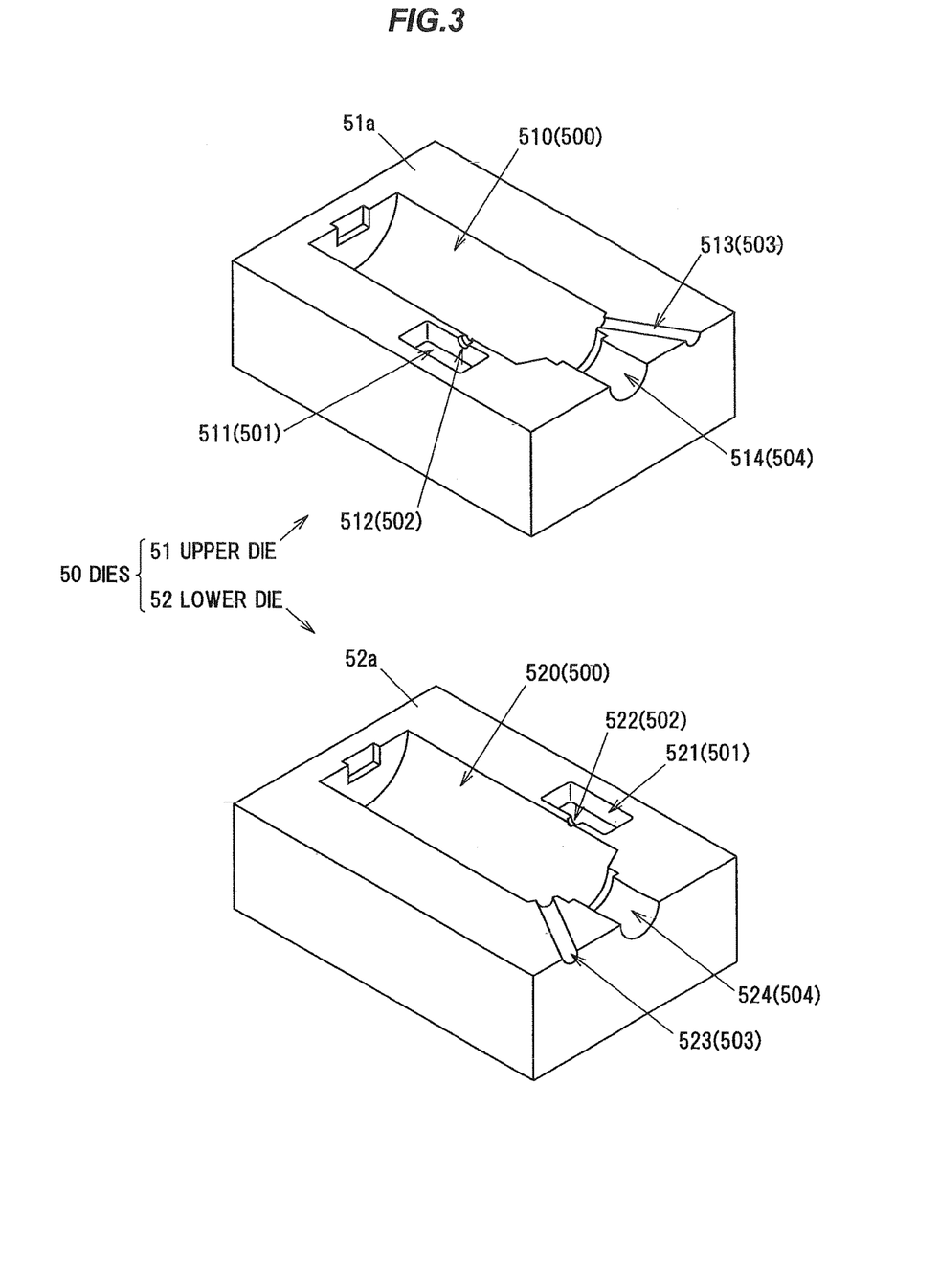
FIG. 3 is a perspective view showing dies used for producing the cable with the resin mold.

FIG. 3 is a perspective view showing dies 50 used for producing the cable 1 with the resin mold. The dies 50 are composed of an upper die 51 and a lower die 52. The resin mold section 2 is formed by combining the upper die 51 and the lower die 52 together and injecting a molten resin into a resulting space therefrom.

The upper die 51 is formed with an upper cavity 510, an upper resin reservoir 511, an upper inflow passage 512, an upper injection passage 513, and an upper cable holding portion 514 therein. The lower die 52 is formed with a lower cavity 520, a lower resin reservoir 521, a lower inflow passage 522, a lower injection passage 523, and a lower cable holding portion 524 therein. The upper die 51 and the lower die 52 are combined together by moving the upper die 51 and the lower die 52 relative to each other in such a manner as to bring a matching surface 51a of the upper die 51 and a matching surface 52a of the lower die 52 into contact with each other.

The upper cavity 510, the upper resin reservoir 511, the upper inflow passage 512, the upper injection passage 513 and the upper cable holding portion 514 are formed as portions recessed relative to the matching surface 51a of the upper die 51. Likewise, the lower cavity 520, the lower resin reservoir 521, the lower inflow passage 522, the lower injection passage 523 and the lower cable holding portion 524 are formed as portions recessed relative to the matching surface 52a of the lower die 52.

The combining together of the upper die 51 and the lower die 52 results in the dies 50 including therein a cavity 500 comprising the upper cavity 510 and the lower cavity 520, a resin reservoir 501 comprising the upper resin reservoir 511 and the lower resin reservoir 521, an inflow passage 502 comprising the upper inflow passage 512 and the lower inflow passage 522, an injection passage 503 comprising the upper injection passage 513 and the lower injection passage 523, and a cable holding portion 504 comprising the upper cable holding portion 514 and the lower cable holding portion 524.

A molten resin is injected from the injection passage 503 into the cavity 500 of the dies 50. The resin reservoir 501 retains a portion of the molten resin flowing through the injection passage 503 into the cavity 500. The cavity 500 and the resin reservoir 501 are in communication with each other via the inflow passage 502 therebetween. That is, the portion of the molten resin flowing into the cavity 500 flows through the inflow passage 502 into the resin reservoir 501.

Figure 4A:
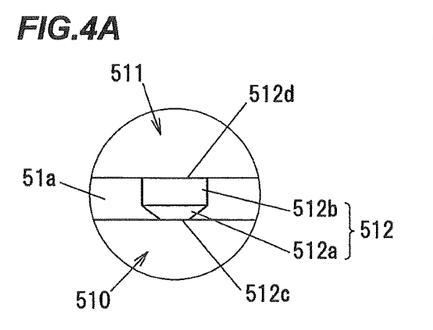
FIG. 4A is an enlarged view showing an upper inflow passage of an upper die.
Figure 4B:
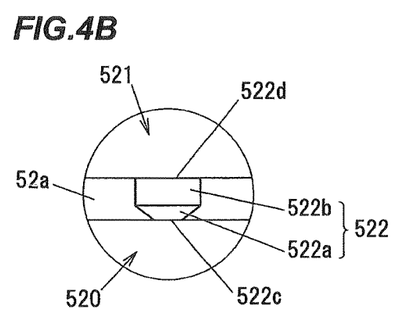
FIG. 4B is an enlarged view showing a lower inflow passage of a lower die.
Figure 4C:
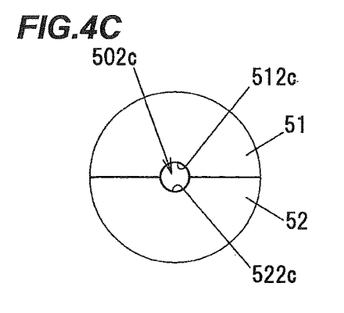
FIG. 4C is an enlarged view showing a first opening of an inflow passage when viewed from inside a cavity.
Figure 4D:
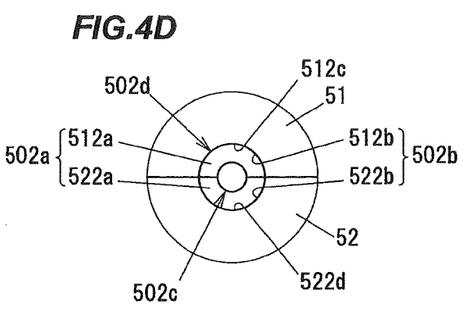
FIG. 4D is an enlarged view showing a second opening of the inflow passage when viewed from inside a resin reservoir.
Figure 4E:
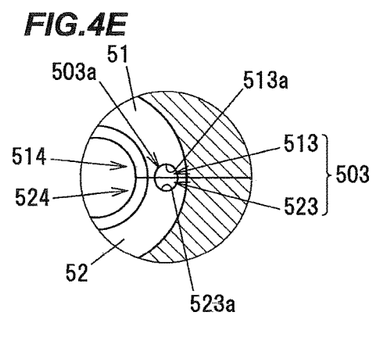
FIG. 4E is an enlarged view showing an inlet of an injection passage when viewed from inside the cavity.

FIG. 4A is an enlarged view showing the upper inflow passage 512. FIG. 4B is an enlarged view showing the lower inflow passage 522. FIG. 4C is an enlarged view showing a first opening 502c of the inflow passage 502 when-viewed from inside the cavity 500. FIG. 4D is an enlarged view showing a second opening 502d of the inflow passage 502 when viewed from inside the resin reservoir 501. FIG. 4E is an enlarged view showing an inlet 503a of the injection passage 503 when viewed from inside the cavity 500.

As shown in FIG. 4B, the upper inflow passage 512 includes a widening diameter portion 512a, which gradually widens in flow passage area from the upper cavity 510 side toward the upper resin reservoir 511 side, and a halved circular cylindrical portion 512b, which is formed on the upper resin reservoir 511 side relative to the widening diameter portion 512a, and whose flow passage area is the same as the maximum flow area of the widening diameter portion 512a. An upper cavity 510 side opening circumferential edge 512c of the widening-diameter portion 512a, and an upper resin reservoir 511 side opening circumferential edge 512d of the halved circular cylindrical portion 512b are each semicircular.

The lower inflow passage 522 is formed in a manner similar to the upper inflow passage 512. That is, as shown in FIG. 4B, the lower inflow passage 522 includes a widening diameter portion 522a, which gradually widens in flow passage area from the lower cavity 520 side toward the lower resin reservoir 521 side, and a halved circular cylindrical portion 522b, which is formed on the lower resin reservoir 521 side relative to the widening diameter portion 522a, and whose flow passage area is the same as the maximum flow area of the widening diameter portion 522a. A lower cavity 520 side opening circumferential edge 522c of the widening diameter portion 522a, and a lower resin reservoir 521 side opening circumferential edge 522d of the halved circular cylindrical portion 522b are each semicircular.

The inflow passage 502 is comprising a tapered portion 502a comprising the respective widening diameter portions 512a and 522a of the upper die 51 and the lower die 52, and a circular cylindrical portion 502b comprising the respective halved circular cylindrical portions 512b and 522b of the upper die 51 and the lower die 52. The tapered portion 502a has a conical inner surface, and is gradually reduced in inner diameter from the circular cylindrical portion 502b toward the cavity 500 side. In other words, the inflow passage 502 includes the tapered portion 502a as a gradual narrowing portion whose flow passage area gradually narrows from the resin reservoir 501 side toward the cavity 500 side first opening 502c.

As shown in FIG. 4C, the cavity 500 side first opening 502c of the inflow passage 502 has a circular circumferential edge comprising the opening circumferential edge 512c of the upper inflow passage 512 of the upper die 51, and the opening circumferential edge 522c of the lower inflow passage 522 of the lower die 52. Also, as shown in FIG. 4D, the resin reservoir 501 side second opening 502d of the inflow passage 502 has a circular circumferential edge comprising the opening circumferential edge 512d of the upper inflow passage 512 of the upper die 51, and the opening circumferential edge 522c of the lower inflow passage 522 of the lower die 52.

The inlet 503a of the injection passage 503 is formed at a cavity 500 side end of the upper injection passage 513 and the lower injection passage 523, and has a circular circumferential edge comprising an opening circumferential edge 513a of the upper injection passage 513 of the upper die 51 and an opening circumferential edge 523a of the lower injection passage 523 of the lower die 52.

A method for producing the cable 1 with the resin mold performed by using the dies 50 includes the steps of: receiving a portion of the cable section 3 in the cavity 500 of the dies 50; injecting a molten resin from the injection passage 503 into the cavity 500; solidifying the molten resin to thereby form a molded resin product; and removing its unnecessary portion from the molded resin product. These steps will each be described in detail below.

Receiving Step

Figure 5:
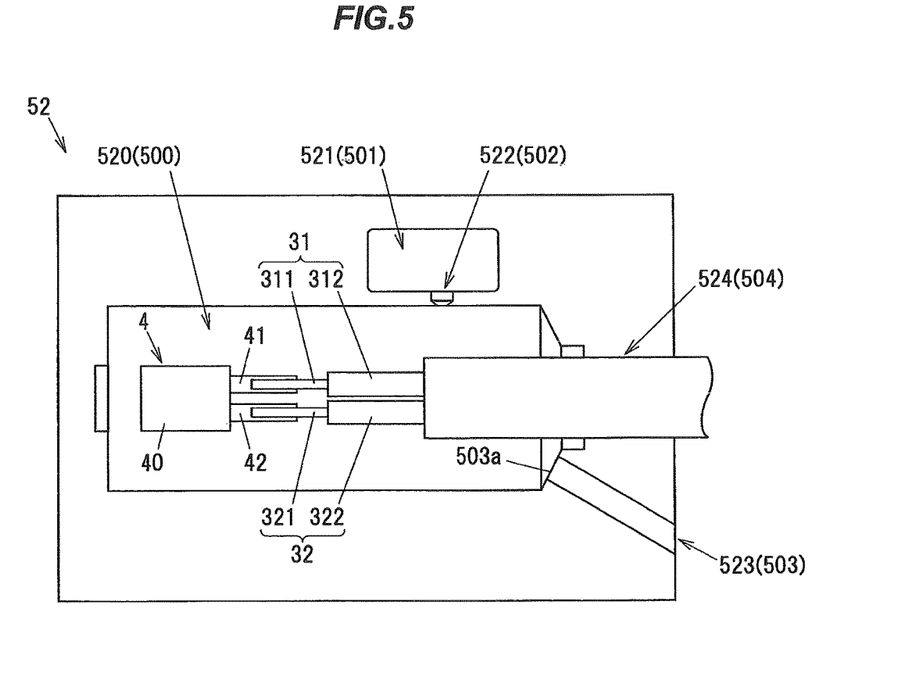
FIG. 5 is an explanatory view showing the lower die with a cable section and a sensor arranged thereon.

FIG. 5 is an explanatory view showing the lower die 52 with the cable section 3 and the sensor 4 arranged thereon. As shown in FIG. 5, an end of the cable section 3 and the sensor 4 are disposed on the lower die 52. The upper die 51 is moved toward the lower die 52, resulting in the cavity 500 being configured as a receiving space in the dies 50, with the end of the cable section 3 and the sensor 4 received therein. The cable section 3 is sandwiched between the upper cable holding portion 514 and the lower cable holder 524.

Injecting Step

FIG. 6A to 6F are schematic views showing a continuous flow of the molten resin 6 in the injecting step. The molten resin 6 is a resin molten by heat to form the resin mold section 2, and is a fluid having fluidity capable of flowing through the injection passage 503 and the inflow passage 502.

In the injecting step, the molten resin 6 is injected from the inlet 503a into the cavity 500. A portion of the molten resin 6 injected into the cavity 500 flows through the inflow passage 502 into the resin reservoir 501. A portion of the sheath 30 of the cable section 3 is then molten by the heat of the molten resin 6 flowing into the resin reservoir 501.

The inflow passage 502 is open into the cavity 500 at such a location that the portion of the sheath 30 lies between the inflow passage 502 and the inlet 503a. More specifically, the portion of the sheath 30 is included in a space defined by a straight line connecting together the circumferential edge of the first opening 502c of the inflow passage 502 and the circumferential edge of the inlet 503a of the injection passage 503. Also, the inlet 503a of the injection passage 503 is directed at the sheath 30. In other words, the sheath 30 is disposed on the extended line of the central axis of the injection passage 503 in the vicinity of the inlet 503a.

Figure 6A:
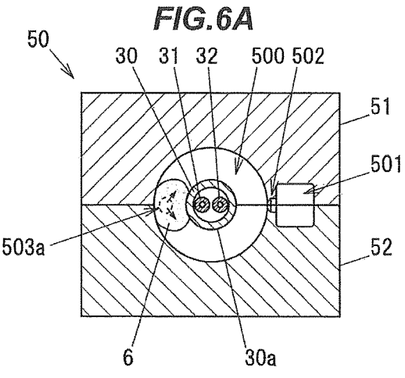
FIGS. 6A to 6F are schematic views showing a continuous flow of a molten resin in an injecting step.
Figure 6B:
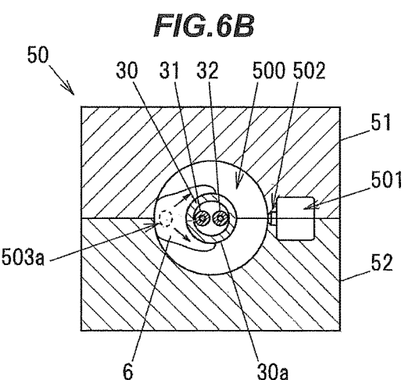
Figure 6C:
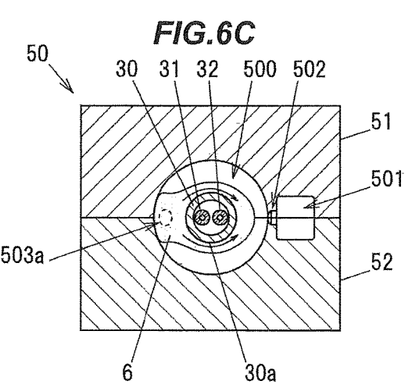

As shown in FIG. 6A, the molten resin 6 provided into the injection passage 503 is injected from the inlet 503a toward the sheath 30. As shown in FIGS. 6B and 6C, the molten resin 6 flows onto an outer surface (outer peripheral surface) 30a of the sheath 30. At this point, the heat is conducted from the molten resin 6 to the sheath 30, increasing the temperature of the outer surface 30a of the sheath 30.

Figure 6D:
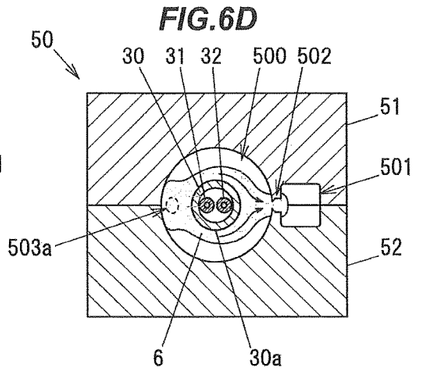

When the further molten resin 6 is injected into the cavity 500, as shown in FIG. 6D, the portion of the molten resin 6 flowing onto the outer surface 30a of the sheath 30 flows through the inflow passage 502 into the resin reservoir 501. The flowing of the portion of the molten resin 6 into the resin reservoir 501 allows the larger amount of the molten resin 6 flowing onto the outer surface 30a of the sheath 30, as compared to when no resin reservoir 501 is formed in the dies 50. In other words, the time for which the molten resin 6 flows onto the outer surface 30a of the sheath 30 is longer.

Figure 6E:
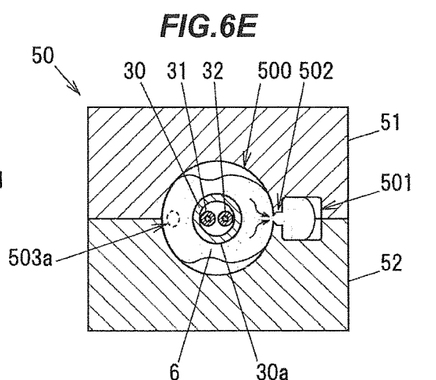
Figure 6F:
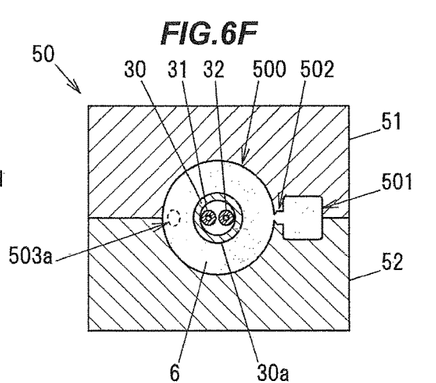

Also, as shown in FIG. 6E, the increase of the molten resin 6 injected into the cavity 500 results in the increase in the inflowing amount of the molten resin 6 into the resin reservoir 501, and when the injecting step is completed, as shown in FIG. 6F, the cavity 500 and the resin reservoir 501 are filled with the resin. Note that the air present between the upper die 51 and the lower die 52 in the cavity 500 and the resin reservoir 501 and the like before the injecting step is vented from a small gap between the matching surface 51a of the upper die 51 and the matching surface 52a of the lower die 52 to outside the dies 50 at the same time as the injection of the molten resin 6.

The sheath 30 is heated by the molten resin 6 flowing onto the outer surface 30a of the sheath 30, and a portion of the surface layer adjacent to the outer surface 30a is molten. This allows the sheath 30 to be welded integrally with the resin, when the molten resin 6 solidifies to form the solid resin. Therefore, sufficient waterproofing is ensured. That is, even if moisture enters through a gap between the extended portion 23 (shown in FIG. 1) of the resin mold portion 2 and the sheath 30, the ingress of the moisture through the welded portion between the sheath 30 and the resin mold portion 2 into the tip side (sensor 4 side) of the cable section 3 is prevented.

The molten resin 6 filled in the cavity 500 and the resin reservoir 501 is then solidified to thereby form a molded resin product, followed by separating the upper die 51 from the lower die 52, and taking the molded resin product together with the cable section 3 out of the dies 50.

Removing Step

In the removing step, the portion solidified within the resin reservoir 501 and the inflow passage 502 is removed from the molded resin product. That is, the resin portion solidified within the resin reservoir 501 and the inflow passage 502 is unnecessary, and is therefore removed. It should be noted that, a burr, if any, on the molded resin product taken out of the dies 50 is also removed. This results in the cable 1 with the resin mold as shown in FIG. 1.

In this removing step, the molded resin product portion formed in the vicinity of the first opening 502c in the inflow passage 502 is cut. The inflow passage 502 has a shape tapered toward the first opening 502c side tip of the tapered portion 502a, thereby allowing for easily cutting the molded resin product. Incidentally, the molded resin product may be cut by using a cutting tool such as a cutter, or may be cut manually and torsionally.

Operation and Advantageous Effects of the Embodiment

The above described embodiment has the following operation and advantageous effects.

(1) Since in the injecting step, the sheath 30 is molten by the heat of the molten resin 6, and formed integrally with the resin mold section 2, the waterproofing of the cable 1 with the resin mold is enhanced.

(2) Since the inflow passage 502 has the first opening 502c at such a location that the sheath 30 lies between the inflow passage 502 and the inlet 503a, the molten resin 6 injected from the inlet 503a flows onto the outer surface 30a of the sheath 30 and easily flows into the inflow passage 502. This allows the sheath 30 to be securely molten by the heat of the molten resin 6. The waterproofing is therefore more enhanced.

(3) Since the inflow passage 502 includes the tapered portion 502a whose flow passage area for the molten resin 6 gradually narrows from the resin reservoir 501 side toward the first opening 502c, it is possible to easily remove the molded resin product portion solidified within the resin reservoir 501 and the inner inflow passage 502 in the removing step. Also, it is possible to reduce the scar on the outer peripheral surface of the circular cylindrical portion 20 (the cut surface of the resin mold product) of the resin mold section 2, therefore have the good appearance, and, for example, when receiving the resin mold section 2 in a receiving hole formed in a measuring device, suppress that cut portion from being stuck.

(4) Since the dies 50 have the resin reservoir 501 therein, it is possible to ensure the amount of the molten resin 6 flowing onto the outer surface 30a of the sheath 30 to melt the sheath 30, even if the outer diameter of the circular cylindrical portion 20 of the resin mold section 2 is small, and the volume of the resin mold section 2 is small. This allows for reducing the outer diameter of the circular cylindrical portion 20 to not larger than 15 mm, for example, thereby making it possible to reduce the size of the cable 1 with the resin mold.

(5) Since the sensor 4 is connected to the first and second electric wires 31 and 32 of the cable section 3, and is molded together with the portion of the sheath 30, it is possible to prevent the ingress of moisture into the body 40 of the sensor 4 or the respective connected portions of the first and second lead wires 41 and 42 and the first and second electric wires 31 and 32, thereby making it possible to enhance the environmental resistance of the cable 1 with the resin mold.

Summary of the Embodiment

Next, the technical concept that is ascertained from the embodiment described above will be described with the aid of the reference characters and the like in the embodiment. It should be noted, however, that each of the reference characters in the following description should not be construed as limiting the constituent elements in the claims to the members and the like specifically shown in the embodiment.

[1] A method for producing a cable (1) with a resin mold including a cable section (3) comprising an electric wire (31, 32) and a sheath (30) comprising a synthetic resin covering the electric wire (31, 32), and a resin mold section (2) into which a portion of the sheath (30) is molded by a resin, comprising:

receiving a portion of the cable section (3) in a receiving space (500) in a die (50) formed with a molten resin (6) inlet (503a), an inflow passage (502), and a resin reservoir (501) therein;

injecting a molten resin (6) from the inlet (503a) into the receiving space (500), a portion of the injected molten resin (6) flowing through the inflow passage (502) and being retained in the resin reservoir (501), the portion of the sheath (30) being molten by heat of the molten resin (6);

solidifying the molten resin (6) to thereby form a molded resin product; and removing its unnecessary portion solidified in the resin reservoir (501) from the molded resin product.

[2] The method according to [1] above, wherein
the inflow passage (502) is open into the receiving space (500) at such a location that the portion of the sheath (30) lies between the inflow passage (502) and the inlet (503a).

[3] The method according to [1] or [2] above, wherein
the inflow passage (502) includes a gradual narrowing portion (502a), which gradually narrows in flow passage area from a resin reservoir (501) side toward a receiving space (500) side opening (502c).

[4] The method according to any one of [1] to [3] above, wherein
the molded resin product after the removing of the unnecessary portion includes a circular cylindrical portion (20) with the cable section (3) being arranged at the center thereof, and the circular cylindrical portion (20) is not larger than 15 mm in outer diameter.

[5] The method according to any one of [1] to [4] above, further comprising
connecting to the electric wire (31, 32) a sensor (4) to measure a physical quantity, and molding the sensor (4) together with the portion of the sheath (30).

Notes

Although the embodiment of the present invention has been described above, the embodiment described above should not be construed to limit the invention in the appended claims. It should also be noted that not all the combinations of the features described in the above embodiment are essential to the means for solving the problems of the invention.

Further, the present invention may be appropriately modified and practiced without departing from the spirit and scope thereof. For example, the shape of the resin mold section 2 is not limited to that illustrated in FIG. 1 and the like, but may be a suitable shape depending on its applications or the like. Also, the sensor 4 is not limited to a magnetic field sensor to measure magnetic field strength, but may employ sensors capable of measuring various physical quantities other than the magnetic field strength, such as temperature, vibration, etc.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A method for producing a cable with a resin mold, the method comprising:
   providing the cable including a cable section, an electric wire, and a sheath;
   covering the electric wire with the sheath;
   providing a die including a molten resin inlet, a receiving space, a resin reservoir, and an inflow passage communicating between the receiving space and the resin reservoir;
   receiving a portion of the cable section in the receiving space of the die while an upper portion of the die and a lower portion of the die are put together;
   injecting a molten resin, including a resin by being heated through the molten resin inlet, into the receiving space and the resin reservoir, to allow a portion of the molten resin flowing through the inflow passage and being retained in the resin reservoir and a portion of the sheath being molten by heat of the molten resin;
   solidifying the molten resin to thereby form a resin mold section in which the portion the sheath is molded by the molten resin;
   separating the upper portion of die from the lower portion of the die; and
   removing a portion of the resin solidified in the resin reservoir and the inflow passage from the resin mold section to form the cable with the resin mold.

2. The method according to claim 1, wherein the inflow passage is open into the receiving space at such a location that the portion of the sheath lies between the inflow passage and the molten resin inlet.

3. The method according to claim 1, wherein the inflow passage includes a gradual narrowing portion, which gradually narrows in a flow passage area from a resin reservoir side toward a receiving space side opening.

4. The method according to claim 1, wherein the cable with the resin mold after the removing of the portion of the resin includes a circular cylindrical portion with the cable section being arranged at a center thereof, and the circular cylindrical portion is not larger than 15 mm in an outer diameter.

5. The method according to claim 1, further comprising:
   connecting to the electric wire a sensor to measure a physical quantity, and molding the sensor together with the portion of the sheath.

6. The method according to claim 1, wherein the resin reservoir causes a temperature of an outer surface of the sheath be elevated by increasing a pouring quantity of the molten resin.

7. The method according to claim 1, wherein the solidifying the molten resin includes integrally welding the sheath with the molten resin.

8. The method according to claim 1, wherein the resin of the molten resin is the same as a material of the sheath.

9. The method according to claim 1, wherein the resin of the molten resin is different from a material of the sheath.

* * * * *